United States Patent Office 3,069,605
Patented Dec. 18, 1962

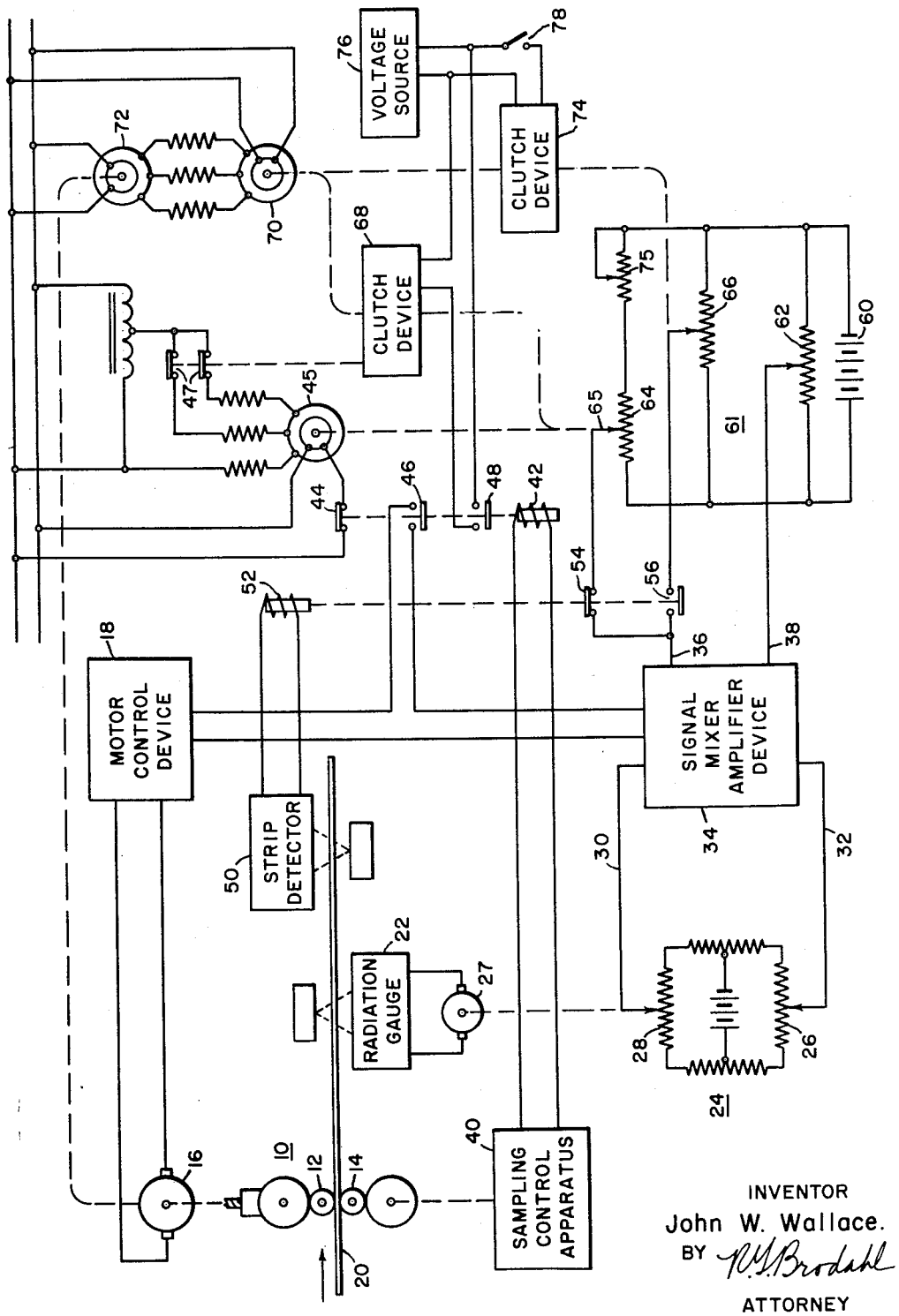

3,069,605
MOTOR CONTROL SERVOSYSTEM
John W. Wallace, Orchard Park, N.Y., assignor to Westinghouse Electric Corporation, East Pittsburgh, Pa., a corporation of Pennsylvania
Filed Mar. 28, 1960, Ser. No. 17,983
5 Claims. (Cl. 318—28)

The present invention relates in general to motor control apparatus for controlling the operation of a motor, and more particularly to control signal providing apparatus operative to provide a motor operation control signal in discrete control time periods and then be reset to an initial or zero error control signal providing setting.

It is an object of the present invention to provide improved control apparatus of the type under consideration and more particularly to provide improved control signal providing apparatus for a motor operative with a strip rolling mill or the like to thereby better control the operation of the motor relative to the inherent and necessary limitations on the operation of that motor.

It is a different object of the present invention to provide improved and more simple control signal providing apparatus for a motor operative with a workpiece in discrete operational periods such that changes made in the motor operation in one such period are substantially removed in a subsequent period before additional changes in the motor operation are made.

It is an additional object to provide improved and more simple control signal providing apparatus operative for controlling a motor or the like device by correcting operational errors of that motor relative to a predetermined desired operation of the motor.

These and other objects and advantages of the present invention will become still more apparent from a study of the following description taken in conjunction with the drawings, wherein there is shown a schematic view of the motor control apparatus in accordance with the teachings of the present invention.

In the drawing the motor control apparatus of the present invention is illustrated as being operative for controlling the operation of a rolling mill screw-down motor and thereby the screw-down setting of the rolls of the strip rolling mill. More specifically a strip rolling mill 10 including an upper roll member 12 and a lower roll member 14 is operative to have its screw-down setting or relative spacing between said roll members adjusted by a screw-down motor 16. A conventional and well known variable voltage motor control device 18 may be operative with the screw-down motor 16 for controlling the screw-down setting of the rolling mill 10. The rolling mill 10 is operative with a strip 20 passing through the rolling mill for controlling the gauge or thickness of that strip. A strip thickness sensing gauge 22 is operative with a bridge control circuit 24, including a reference potentiometer 26 and an actual setting sensing potentiometer 28, for providing a thickness error signal through the conductors 30 and 32 to a first input of a signal mixer and amplifier device 34. A second control signal is supplied through conductors 36 and 38 to a second input of the signal mixer and amplifier device 34 as will be later described.

The rolling mill 10 is connected mechanically to a sampling control apparatus 40 which is operative to provide at periodic intervals, dependent upon the operating speed of the rolling mill 10, separate On and Off sampling period control signals such that a periodic On sampling period signal is provided which energizes a relay winding 42 for opening a contactor 44 and closing each of contactors 46 and 48. Then after this predetermined On sampling time interval, a sampling Off period is provided during which no control signal is provided by the sampling control apparatus 40 such that the relay winding 42 is not energized during the Off period and the contact member 44 is thereby closed and the contact members 46 and 48 are thereby opened.

A strip detector 50 is provided for sensing the presence or absence of the strip member 20. More specifically when the strip member 20 is present at the position of the strip detector 50 a control signal is supplied to energize the relay winding 52 for closing the contact member 54 and opening the contactor member 56. When the strip 20 is not present in the position of the strip detector 50 the relay winding 52 is not energized and the contact member 54 is thereby opened and the contact member 56 is thereby closed.

A voltage supply 60 is operative in another control bridge circuit 61 including a reference potentiometer or tapped resistor 62 which is manually adjusted in accordance with a predetermined and desired reference thickness or gauge for the strip 20 and a feedback potentiometer 64 which is cooperative with the reference potentiometer 62 as will be later explained to provide a motor operation error or difference signal through the conductors 36 and 38 to the signal mixer and amplifier device 34 for balancing out the previously mentioned first control signal supplied through the conductors 30 and 32 to the signal mixer and amplifier device 34. In addition a reset potentiometer 66 is operative with the voltage source 60 for following the operation of the screw-down motor 16 as will be later described.

A first clutch device 68 is operative between a synchro receiver motor 70 and the feedback potentiometer 64 for controlling the adjustment of the contact member 65 on the feedback potentiometer 64, in accordance with the movement of the screw-down motor 16 through a mechanical connection to the synchro transmitter motor 72 operative with the synchro receiver motor 70. A second clutch device 74 is operatively connected between the synchro receiver 70 and the reset potentiometer 66 for controlling the position of the movement arm or contact arm on the reset potentiometer 66, in accordance with the movement of the screw-down motor 16. A voltage source 76 is operative with the first clutch device 68 as determined by the contactor 48 operative with the relay winding 42. The second clutch device 74 is operative with the voltage source 76 as determined by the manual switch member 78 as will be later described. The clutch device 68 and the clutch device 74 are mechanically open unless they are electrically energized by the voltage source 76.

In the operation of the motor control apparatus in accordance with the teachings of the present invention it is desirable to correct any errors in the actual thickness of the strip 20 relative to a predetermined desired or reference strip thickness. The thickness gauge 22 is operative to sense the actual thickness of the strip 20 for controlling through a servo motor 27 the position of the contact arm on the potentiometer 28. The predetermined and desired reference thickness of the strip 20 is manually determined by the setting of the contact arm on the potentiometer 26. Any difference between the actual strip thickness and the reference strip thickness results in an error or difference control signal supplied through the conductors 30 and 32 to the first input of the signal mixer amplifier device 34.

The voltage source 60 is operative with the reference potentiometer 62, which also is manually adjusted in accordance with the predetermined desired or reference strip thickness, and the feedback potentiometer 64 for providing through the contactor 54 a second control signal to the second input of the signal mixer amplifier device 34. This second control signal opposes the first control signal, and thereby effectively balances it out when the feedback setting of the feedback potentiometer 64 is substantially the same as the setting of the actual thickness sensing potentiometer 28. In this regard it should be noted that the contactor 54 is closed when the strip 20 is present adjacent the position of the strip detector 50.

When the sampling control apparatus 40 initiates an On sampling period, the thickness gauge 22 is operative with the actual thickness potentiometer 28 to provide the thickness error first control signal through the conductors 30 and 32 to the first input of the signal mixer amplifier device 34. This first control signal causes the motor control device 18 to change the operation of the screw-down motor 16 for correcting the actual thickness of the strip 20 in accordance with the predetermined desired or reference thickness for the strip 20. This correction movement of the screw-down motor 16 is applied through the mechanical connection to the synchro transmitter 72 and thereby to the synchro receiver 70 and through the clutch device 68 to vary away from the initial or zero setting the position of the contact arm on the feedback potentiometer 64. This latter variation of the contact arm of the feedback potentiometer 64 from its zero or initial position results in the providing of the second control signal which substantially matches the first control signal in the operation of the signal mixer amplifier device 34. This second control signal from the feedback potentiometer 64 and the reference potentiometer 62 is operative to balance out the first control signal supplied through the conductors 30 and 32 such that the screw-down motor 16 is thereby stopped when the correcting movement of the screw-down motor 16 has been sufficient to change the actual thickness of the strip 20 to substantially correspond to the predetermined and desired reference thickness for the strip 20.

The sampling control apparatus 40 terminates its control signal at the end of the predetermined On sample period, which is determined in duration by the movement speed of the strip 20 and necessitated by the strip transport time delay between the rolling mill 10 and the position of the thickness gauge 22 such that a strip thickness correction made by the rolling mill 10 has an opportunity to reach the position of the thickness gauge 22. For the time duration of the Off sampling period, the sampling control apparatus 40 no longer provides a control signal to energize the relay winding 42. This opens the contactors 46 and 48 to thereby remove the signal mixer amplifier device 34 from the connection to the motor control device 18, and further to deenergize the clutch device 68. The clutch device 68 now opens mechanically to disconnect the contact arm of the feedback potentiometer 64 and the synchro receiver 70. When the relay winding 42 is in this manner deenergized the contactor 44 closes to energize the auto-transformer operated synchro motor 45 for providing a predetermined electrical zero position reset for the contact arm of the feedback potentiometer 64. The auto-transformer operated synchro 45 is a well known device and is operative such that its rotor always moves to the same torque equilibrium position. The contactors 47 may if desired be operative with the clutch 68 such that these contactors 47 are open when the clutch 68 is closed and vice versa. Thusly, the open contactors 47 remove the torque on the rotor of the synchro 45 to allow the operation of the screw-down motor 16 to be operative through the clutch 68 in driving the potentiometer 64 setting. Then, with the clutch 68 open and the contactors 47 closed, the potentiometer 64 is reset to its initial zero position by the synchro 45. The desired initial or zero correction position of the contact arm of the feedback potentiometer 64 thereby results and corresponds to the setting or position of the reference potentiometer 62. This removes the second control signal supplied through the conductors 36 and 38 to the second input of the signal mixer amplifier device 34.

At the end of the predetermined Off sample control period another On sample control period is again provided which means that another control signal is supplied by the sampling control apparatus 40 to the relay winding 42 to result in the opening of the contactor 44 and the closing of the contactors 46 and 48. This mechanically closes the clutch device 68 and again connects the signal mixer amplifier device 34 to the motor control device 18 such that any thickness error signal supplied through the conductors 32 and 30 to the first input of the signal mixer amplifier device 34 causes the screw-down motor 16 to change its position, which in turn due to the mechanical connection to the synchro transmitter 72 causes the synchro receiver 70 through the clutch device 68 to vary the position of the contact arm on the feedback potentiometer 64. This provides a second control signal through the conductors 36 and 38 which opposes and substantially matches at the zero error condition the thickness error control signal supplied through the conductors 30 and 32.

At the end of a given portion or length of the strip 20, the strip detector 50 senses the absence of the strip 20 and thereby de-energizes the relay winding 52 to result in the contactor 54 being open and the contactor 56 being closed. This now connects the reset potentiometer 66 in combination with a reference potentiometer 62 through the conductors 36 and 38 to the second input of the signal mixer amplifier device 34.

Since the clutch device 74 is closed mechanically when the switch 78 is closed, the reset potentiometer 66 follows the actual position of the screw-down motor 16 during the screw-down changes for any given strip through the operation of the synchro transmitter 72 and synchro receiver 70. Now any final or end-of-strip difference between the actual position of the screw-down motor 16 and an initial strip thickness setting which is desired for the beginning of a particular length or portion of the strip 20 causes the second input of the signal mixer amplifier device 34 to be energized through the contactor 56 and results in the motor control device 18, when the contactor 46 is closed, causing the screw-down motor 16 to adjust its position in accordance with the bridge reference setting of the reference potentiometer 62, until the reset potentiometer setting is matched to the reference setting of the reference potentiometer 62.

With the switch 78 closed, the clutch device 74 is electrically energized and thereby mechanically closed such that the setting of the reset potentiometer 66 is matched to the setting of the reference potentiometer 62 by the screw-down motor changing the positional setting of the reset potentiometer 66 through the synchro transmitter 72 and the synchro receiver 70. After this matching operation is completed, the switch 78 is opened to mechanically open the clutch device 74. This leaves the reset potentiometer 66 set in its substantially center position with a zero voltage difference between the conductors 36 and 38. The screw-down motor is now operated through the contactor 54 to vary the screw-down setting of the rolls to the desired reference position. The switch 78 is now closed again to mechanically couple through the clutch device 74 the reset potentiometer 66 to the screw-down motor 16 as sensed by the synchro receiver 70.

The operation of the reset potentiometer 66 is now such that the screw-down motor is returned at the end of each strip to the desired reference position during every reset operation, as determined by the closing of contactor 56.

A trimmer potentiometer 75 is provided in series with the feedback potentiometer 64 for changing the effective adjustment of the feedback potentiometer 64 such that it can still have a substantially center physical position for its initial or zero correction setting.

Although the present invention has been described

I claim as my invention:

1. In control apparatus for a motor operative with a workpiece, the combination of a first signal providing device operative to provide a reference motor operation signal, a second signal providing device including an adjustable control member having a zero operation correction signal setting and being operative with said motor to provide an actual motor operation sensing signal, said first and second signal providing devices being operative with each other to provide a motor operation error correction signal, motor control apparatus operative with said motor and responsive to said error signal for changing the operation of said motor in accordance with said error signal, and a reset control device operative with said second signal providing device for effecting a predetermined adjustment of the setting of said control member in response to a predetermined condition of said control apparatus, with said reset control device being operative only when said predetermined condition of said control apparatus is present.

2. In control apparatus for a motor operative with a workpiece, the combination of a first signal providing device operative to provide a reference signal, a second signal providing device having an adjustable control member and being operative with said motor during a first control period to provide a motor operation sensing signal, said first and second signal providing devices being operative with each other to provide a motor operation error signal, motor control apparatus operative with said motor and responsive to said error signal during said first control period for changing the operation of said motor in accordance with said error signal, and a reset control device operative with said second signal providing device during a second control period for effecting a zero error adjustment of the position of said control member in response to a predetermined condition of said workpiece, with said reset control device being operative only during said second control period.

3. In control apparatus for a motor operative with a movable workpiece, the combination of a first signal providing device operative to provide a reference signal, a second signal providing device having an adjustable control member and being operative with said motor to provide a motor operation sensing signal, said first and second signal providing devices being operative with each other to provide a motor operation error signal, motor control apparatus operative with said motor and responsive to said error signal for changing the operation of said motor in accordance with said error signal, control period determining apparatus operative with said workpiece for providing an output signal at discrete intervals of time in accordance with the movement of said workpiece, and a reset control device responsive to said output signal and operative with said second signal providing device for effecting a predetermined zero error adjustment of the position of said control member in response to the movement of said workpiece.

4. In control apparatus for a motor, the combination of a first signal providing device operative to provide a predetermined motor operation reference signal, a second signal providing device operative with said motor during a first predetermined motor control period to provide a motor operation sensing signal, with said first signal providing device being operative with said second signal providing device to provide a motor operation error signal during said first predetermined motor control period, motor control apparatus operative with said motor and responsive to said operation error signal for correcting the operation of said motor in accordance with said operation error signal, a signal resetting device operative with one of said first and second signal providing devices during a second predetermined motor control period to reset to a zero setting said one signal providing device.

5. In control apparatus for a motor operative with a machine device, the combination of a first signal providing device operative to provide a predetermined reference motor operation signal, a second signal providing device operative with said motor during a first machine device control period to provide an actual motor operation signal, with said first signal providing device being operative with said second signal providing device to provide a motor operation error signal during said first control period, motor control apparatus operative with said motor and responsive to said error signal for changing the operation of said motor in accordance with said operation error signal, and a synchro device having a zero operating position and being operative with said second signal providing device during a second machine device control period to cause said second signal providing device to change its operation in accordance with a predetermined zero error operation of said motor.

References Cited in the file of this patent

UNITED STATES PATENTS 2,909,717    Hulls et al. _____ Oct. 20, 1939

OTHER REFERENCES

Article: "Continuous Gauging Automation," March 1956, page 56, figure at top of page.